United States Patent [19]

Ehrenfels

[11] Patent Number: 5,434,360
[45] Date of Patent: Jul. 18, 1995

[54] CLOSURE PLUG FOR ELECTRICAL ENCLOSURE

[75] Inventor: Alfred L. Ehrenfels, Cheshire, Conn.

[73] Assignee: Hubbell Incorporated, Orange, Conn.

[21] Appl. No.: 83,038

[22] Filed: Jun. 29, 1993

[51] Int. Cl.⁶ .............................................. H02G 3/18
[52] U.S. Cl. .................................. 174/65 R; 174/151
[58] Field of Search ............ 174/65 R, 151; 220/200; 292/251, 256

[56] References Cited

U.S. PATENT DOCUMENTS

| | | | |
|---|---|---|---|
| 1,491,325 | 4/1924 | Thomas, Jr. | |
| 2,444,268 | 6/1948 | Peters | 220/3.8 |
| 3,072,287 | 1/1963 | Sampson | 220/59 |
| 3,104,120 | 9/1963 | Myers | 285/161 |
| 3,200,366 | 8/1965 | Stuart | 285/161 |
| 3,358,870 | 12/1967 | Larkins | 220/27 |
| 3,659,880 | 5/1972 | Goldsobel | 285/161 |
| 3,902,625 | 9/1975 | Schmidhuber | 220/246 |
| 4,194,770 | 3/1980 | Richards | 285/206 |
| 4,823,977 | 4/1989 | Stanley et al. | 220/243 |
| 4,900,068 | 2/1990 | Law | 285/161 |
| 4,951,914 | 8/1990 | Meyers et al. | 249/11 |
| 5,132,493 | 7/1992 | Sheehan | 174/65 R |

OTHER PUBLICATIONS

Raco Electrical Products Catalog—R-192, 1992 p. A25.

*Primary Examiner*—Leo P. Picard
*Assistant Examiner*—Paramita Ghosh
*Attorney, Agent, or Firm*—Jerry M. Presson; David L. Tarnoff

[57] ABSTRACT

A closure plug having a pair of insulating members coupled together by a fastener for plugging an opening in an electrical box or an enclosure. The closure plug also includes a gasket for providing a weather tight seal around the opening in the electrical box. The fastener is frictionally retained in one of the insulating members for rotation therewith. The insulating member with the fastener coupled thereto preferably has a plurality of ribs for rotation the fastener into a hole formed in the other insulating member.

4 Claims, 2 Drawing Sheets

CLOSURE PLUG FOR ELECTRICAL ENCLOSURE

FIELD OF THE INVENTION

The present invention relates to a closure plug for electrical boxes or enclosures. More specifically, this invention relates to a closure plug having a pair of non-metallic insulating members releasably coupled together by a fastener for plugging an opening in an electrical box or enclosure.

BACKGROUND OF THE INVENTION

Currently unused conduit entrance opening or knockout opening in electrical boxes, housings and enclosure are plugged by using a metallic closure plug such as disclosed in U.S. Pat. No. 3,358,870 to Larkins. However, such closure plugs have several disadvantages. For example, if such a metallic closure plug is utilized with a non-metallic box, then most codes require a bonding jumper to be used for electrically grounding the closure plug. In addition, closure plugs such as those disclosed in the Larkins patent does not provide a weather tight seal sufficient to resist moderate water immersion and a "hose down" from a spray of water. Accordingly, such closure plugs are not suitable for exterior use.

Another closure plug currently being used is the Myers' closure plug which is a two piece, metallic closure plug with a rubber gasket. While the Myers' closure plug overcomes the sealing problem of the closure plug disclosed in the Larkins patent, it still requires a bonding jumper for grounding the closure plug. Accordingly, the Myers' closure plug is time consuming to install on non-metallic enclosure since the Myers' closure plug, like other metallic closure plugs, must be grounded.

Other examples of closure plugs or a coupling for conduits, which are coupled to a knockout opening of an enclosure, are disclosed in French Patent 1,529,492 to Arlati, and in the following U.S. Pat. Nos. 1,491,325 to Thomas, Jr.; 3,072,287 to Sampson; 3,104,120 to Myers; 3,200,366 to Stuart; 3,902,625 to Schmidhuber; and 4,900,068 to Law. However, these closure plugs are often difficult to assembly and disassemble as necessary.

In view of the above, it is apparent that a need exists for a closure plug which does not require grounding when used with a non-metallic enclosure and which is inexpensive to manufacture. This invention addresses this need in the art, along with other needs which will become apparent to those skilled in the art once given this disclosure.

SUMMARY OF THE INVENTION

A primary object of the subject invention is to provide a closure plug for an electrical box or enclosure having at least an insulated portion positioned within the interior of the electrical box or enclosure.

A further object of the present invention is to provide a closure plug which is relatively inexpensive and simple to manufacture.

A further object of the present invention is to provide a closure plug which is corrosion resistant.

Another object of the present invention is to provide a closure plug which is relatively easy to assemble in an opening formed in an electrical enclosure or box.

Still another embodiment of the present invention is to provide a closure plug which does not require the use of tools for assembling of the closure plug in the opening of an electrical enclosure or box.

The foregoing objects are basically attained by providing a closure plug for plugging an opening in an electrical enclosure, comprising a first insulated member sized slightly larger than the opening in the electrical enclosure to be plugged for engaging a first surface of the electrical enclosure; a second member sized slightly larger than the opening in the electrical enclosure to be plugged for engaging a second surface of the electrical enclosure; and a fastening member for coupling the first member to the second member to plug the opening in the electrical enclosure.

Other objects, advantages, and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings which form part of this original disclosure.

DETAILED DESCRIPTION OF THE INVENTION

Figure 1:
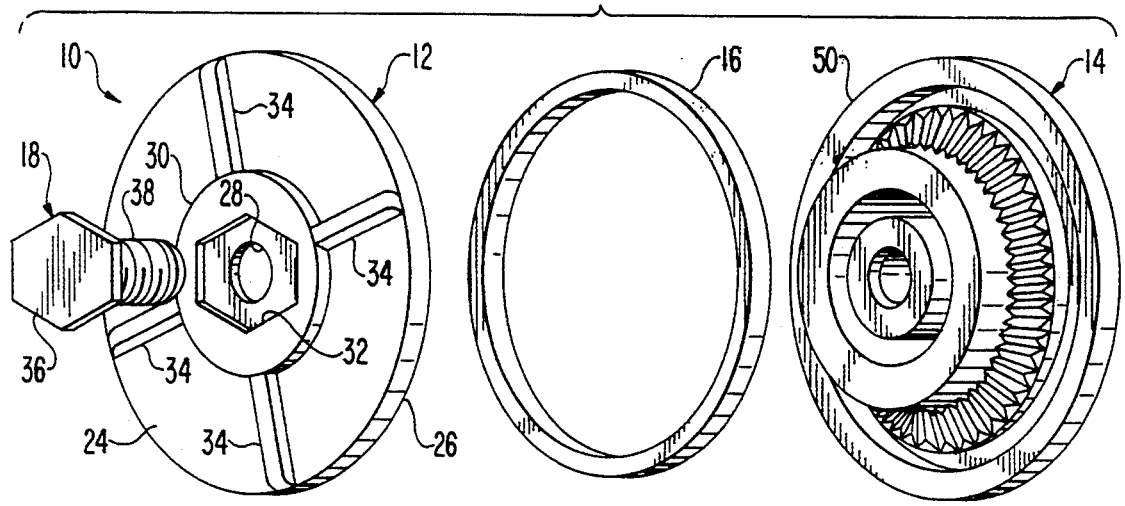
FIG. 1 is a left side perspective view of a closure plug in accordance with the present invention.
Figure 2:
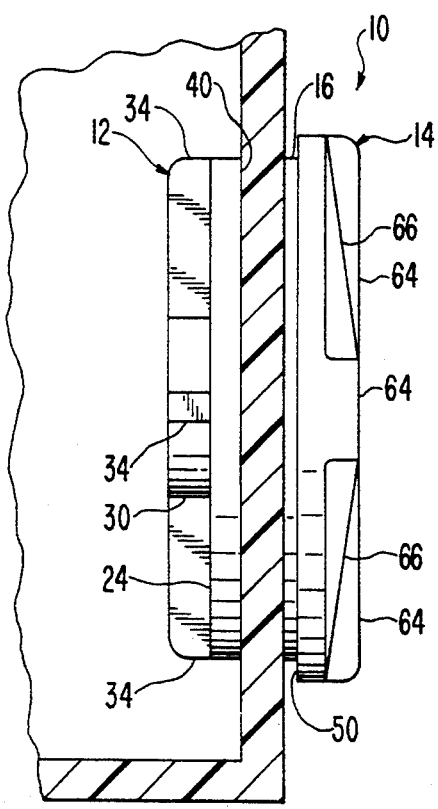
FIG. 2 is a side elevational view of the closure plug illustrated in FIG. 1 coupled within an opening of an electrical enclosure shown in cross-section.

Initially referring to FIG. 1, a closure plug 10 in accordance with the present invention is illustrated, and includes a first or interior member 12, a second or exterior member 14 releasably coupled to interior member 12, a gasket or sealing member 16 positioned between interior member 12 and exterior member 14 for engaging a portion of electrical box 22, and a threaded fastener or screw 18 for releasably coupling.

Figure 3:
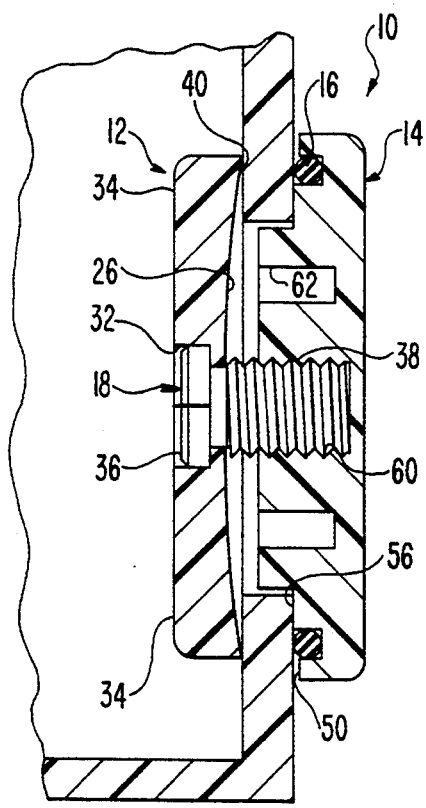
FIG. 3 is a longitudinal cross-sectional view of the closure plug illustrated in FIGS. 1 and 2 coupled within an opening of an electrical enclosure shown in cross-section.

Interior and exterior members 12 and 14 are preferably both constructed of an insulating, hard polymeric material, such as nylon, polycarbonate or any other suitable hard plastic material. As seen in FIG. 3, both interior and exterior members 12 and 14 are preferably disk shaped and sized slightly larger than a knockout opening 20 in an electrical enclosure or box 22 for sealing knockout opening 20 as discussed below. Also, both interior member 12 and exterior member 14 are preferably constructed as one-piece, unitary, integral members molded from an insulating material.

Fastener 18 is preferably a self-tapping metallic screw which is frictionally retained to interior member 12 via a press-fit and threadedly coupled to exterior member 14 as discussed below. Fastener 18 includes a hexagonal head portion 36 and a threaded shaft portion 38.

Interior member 12 includes a first surface 24 facing into the interior of enclosure 22, a second surface 26 facing and engaging the interior surface of enclosure 22, and a fastener hole 28 extending axially through interior member 12 between first and second surfaces 24 and 26 for receiving fastener 18 therein.

Figure 5:
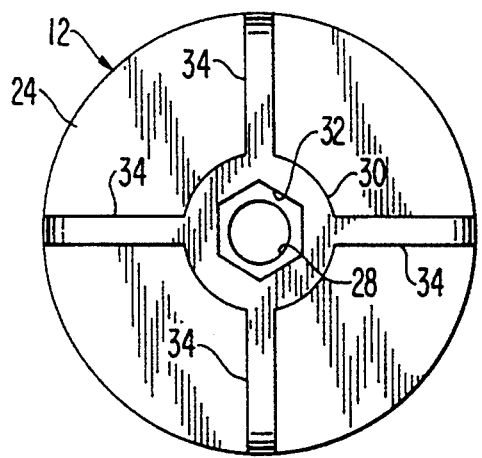
FIG. 5 is a left end elevational view of one side of the first or interior member of the closure plug illustrated in FIGS. 1–4.

As seen in FIGS. 1 and 5, first surface 24 includes a circular hub portion 30 with a hexagonal recess 32 concentrically positioned about fastener hole 28, and four ribs 34 extending radially outwardly from the center of interior member 12 and spaced approximately 90° apart.

Hexagonal recess 32 is preferably sized to frictionally receive head portion 36 of fastener 18 therein via a press fit. Likewise, fastener hole 28 is preferably sized to frictionally engage shaft portion 38 of fastener 18. Accordingly, fastener 18 is fixedly coupled to interior member 12 for rotation therewith. Of course, it will be apparent from those skilled in the art once given this disclosure that hexagonal recess 32 and head portion 36 can have any non-circular shape in which recess 32 frictionally receives head portion 36 of fastener 18 therein. Once shaft portion 38 of fastener 18 is inserted through hole 28 of interior member 12 so that head portion 36 is frictionally engaged within recess 32, the interior member 12 with ribs 34 acts as a wrench on head portion 36 of fastener 18 for rotating and threading fastener 18 into exterior member 14.

Figure 4:
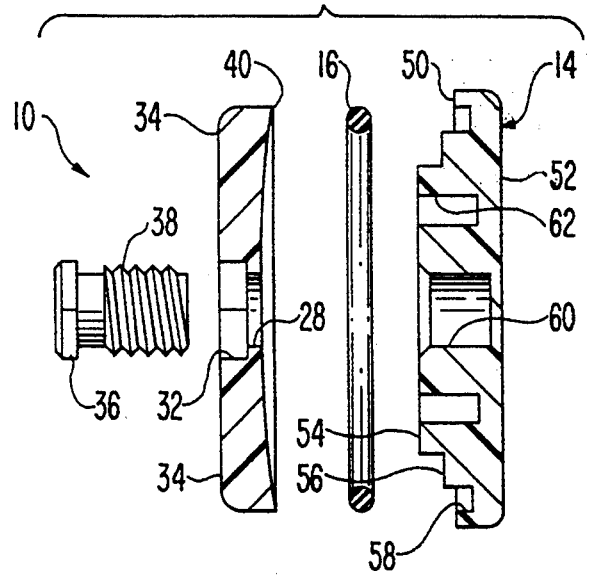
FIG. 4 is a longitudinal cross-sectional view of the closure plug illustrated in FIGS. 1–3 with the fastener shown in elevation.
Figure 6:
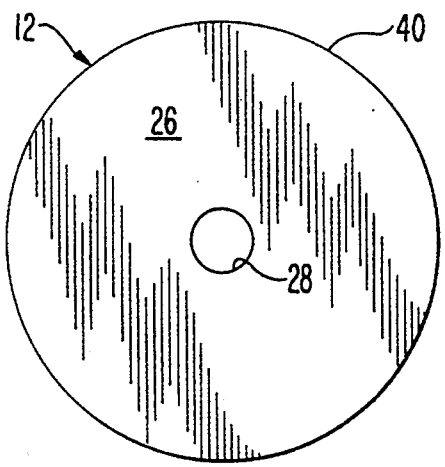
FIG. 6 is a right end elevational view of the other side of the first or interior member of the closure plug illustrated in FIG. 5.

As seen in FIGS. 4 and 6, second surface 26 of interior member 12 is preferably a smooth, crowned or concaved surface with a peripheral edge 40 which engages the interior surface of enclosure 22. This ensures that the pressure exerted by interior member 12 on the interior surface of enclosure 22 is distributed about the periphery of interior member 12 to uniformly compress gasket 16.

Figure 7:
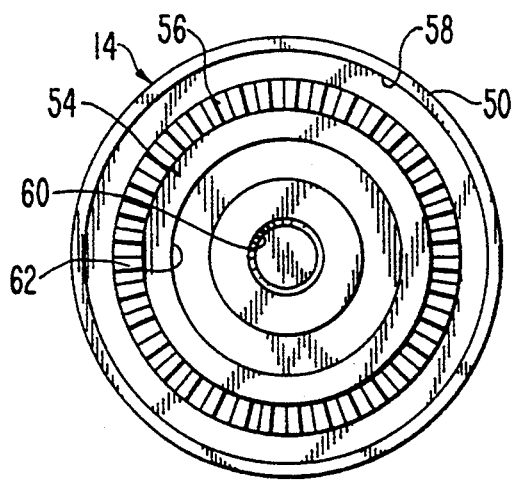
FIG. 7 is a left end elevational view of one side of the second or exterior member of the closure plug illustrated in FIGS. 1–4.
Figure 8:
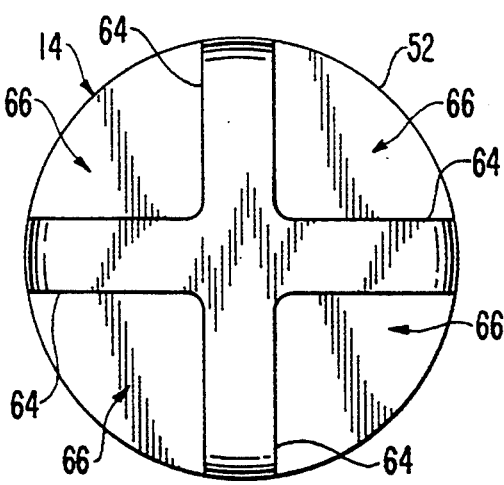
FIG. 8 is a right end elevational view of the other side of the second or exterior member of the closure plug in FIGS. 1–4.

As seen in FIGS. 4, 7 and 8, exterior member 14 has a first side 50 facing towards and engaging the exterior surface of enclosure 22, and a second side 52 facing in the opposite direction and exposed to the environment outside of enclosure 22. First side 50 includes a centrally located cylindrical stem portion 54, and annular enclosure contacting surface 56 facing axially towards the exterior surface of enclosure 22, and an annular groove 58 for receiving gasket or sealing member 16 therein.

Cylindrical stem portion 54 has a centrally located axially extending bore 60, and an annular recess 62 positioned concentrically around bore 60. Bore 60 is preferably unthreaded, and is sized to be tapped or threaded by threaded shaft portion 38 of fastener 18 when threaded therein. Accordingly, it is unnecessary to preform bore 60 with threads. However, it will be apparent to those skilled in the art that bore 60 can be prethreaded for threadedly receiving shaft portion 38 of fastener 18 therein.

Annular recess 62 reduces the amount of material for constructing exterior member 14 and assists in the molding process of exterior member 14. Accordingly, stem portion 54 can be constructed without annular recess 62, if desired.

The diameter of stem portion 54 is preferably slightly smaller than the diameter of the knockout opening 20 of enclosure 22 for being received therein. Also, the axially extending height of stem portion 54 from contacting surface 56 is preferably slightly smaller than the thickness of the wall of electrical enclosure 22 as particularly seen in FIG. 3. This ensures that stem portion 54 does not contact interior member 12 so that closure plug 10 is securely coupled in opening 20 of enclosure 22 and gasket 16 is compressed against enclosure 22 for sealing opening 20.

Contacting surface 56 preferably is serrated with a tooth-like configuration to prevent relative rotation of exterior member 14 against the exterior surface of the wall of enclosure 22 during assembly of closure plug 10 within opening 20.

Annular groove 58 is preferably sized to frictionally engage and retain gasket or sealing member 16 therein. Preferably, recess 62 is circular with an inner diameter larger than the diameter of opening 20 of enclosure 22. Preferably, the median diameter of recess 62 is approximately the same diameter as interior member 12 to ensure a weather tight shield between gasket 16 and the exterior surface of enclosure 22 upon coupling closure plug 10 to enclosure 22.

As seen in FIGS. 4 and 8, second side 52 preferably has four radially extending ribs 64 spaced approximately 90° apart with slanted surface 66 extending between each of the adjacent ribs 64. Ribs 64 allow the user to hold exterior members 14 during assembly of closure plug 10 within opening 20 of enclosure 22 and to prevent rotation of exterior member 14 relative to enclosure 22. Of course, it will be apparent to those skilled in the art that exterior member 14 can be formed with ribs 64 to prevent unauthorized removal of closure plug 10 from opening 20 of enclosure 22. In particular, since exterior member 14 is the only exposed portion of closure plug 10 by constructing the second side 52 as a smooth exterior surface, this will make it difficult to remove closure plug 10 without access to the interior of enclosure 22.

Referring to FIGS. 1, 3 and 4, gasket or sealing member 16 is preferably an elastomeric O-ring made of a neoprene rubber or a silicone rubber. The diameter of gasket 16 is preferably sized to be frictionally retained within recess 62 and to project axially outwardly from recess 62 for engaging the exterior surface of enclosure 22. In particular, the axial height or thickness of gasket 16 is greater than the axially extending height of contact surface 56 so that gasket 16 engages the exterior surface of enclosure 22 and is compressed during assembly of closure plug 10 within opening 20 to ensure a weather tight seal therebetween.

ASSEMBLY

To install closure plug 10 in an opening 20 of an enclosure 22, sealing member 16 is first inserted in groove 58 of exterior member 14, and threaded fastener 18 is inserted into fastener hole 28 so that head portion 36 is frictionally retained within recess 32 of interior member 12.

Next, exterior member 14 is positioned over opening 20 of enclosure 22 so that stem portion 54 extends partially into opening 20 and gasket 16 seats against the exterior surface of enclosure 22. Finally, threaded fastener 18 is threaded into blind bore 60 of exterior member 14 by rotating interior member 12 via ribs 34. Rotation of interior member 12 together with threaded fastener 18 causes blind bore 60 to be tapped or threaded by shaft portion 38 of fastener 18. Interior member 12 is rotated until peripheral edge 40 engages the interior surface of enclosure 22 and compresses gasket 16 against the exterior surface of enclosure 22, and contacts surface 56 of exterior member 14 engages the exterior of enclosure 22. Thus, the wall of enclosure 22 is sandwiched between the peripheral edge 40 of interior member 12 and the contact surface 56 of exterior member 14.

While only one embodiment has been chosen to illustrate the invention, it will be apparent by those skilled in the art that various changes and modifications can be made herein without departing from the scope of the invention as described in the appended claims.

What is claimed is:

1. A closure plug in combination with an electrical enclosure for plugging an opening in the electrical enclosure, comprising:

an interior insulating member sized slightly larger than the opening in the electrical enclosure to be plugged for engaging an interior surface of the electrical enclosure, said interior member having a centrally located fastener hole and a non-circular recess concentrically positioned around said fastener hole;

an exterior insulating member sized slightly larger than the opening in the electrical enclosures to be plugged for engaging an exterior surface of the electrical enclosure, said exterior member having an inwardly facing side with a stem portion extending outwardly therefrom into the opening in the electrical enclosure and sized slightly smaller than the opening in the electrical enclosure, a centrally located blind bore formed in said stem portion, a serrated surface position around said stem portion for engaging the exterior surface of the electrical enclosure, and an annular recess positioned around said serrated surface;

a sealing member frictionally retained in said annular recess of said exterior member for creating a seal between the electrical enclosure and said exterior member; and a screw for removably coupling said interior member to said exterior member to plug the opening in the electrical enclosure, said screw having a non-circular head portion non-rotatably received and frictionally retained in said non-circular recess of said interior member via press-fit and a threaded shaft portion for threadedly engaging said blind bore formed in said exterior member.

2. A closure plug according to claim 1, wherein said interior and exterior members are constructed of a rigid polymeric material.

3. A closure plug according to claim 1, wherein said interior member has at least one rib formed thereon for rotating said interior member relative to said exterior member.

4. A closure plug according to claim 1, wherein said exterior member has at least one rib formed on an outwardly facing side for rotating said exterior member relative to said interior member.

* * * * *